United States Patent
Mann (10) Patent No.: US 12,482,846 B2
(45) Date of Patent: Nov. 25, 2025

(54) REMOVABLE LOAD CELL DESIGN FOR FUEL CELL STACK

(71) Applicants: AVL List GmbH, Graz (AT); AVL Fuel Cell Canada Inc., Burnaby (CA)

(72) Inventor: Bhagwant Tejpaul Mann, Burnaby Burnaby (CA)

(73) Assignees: AVL List GmbH, Graz (AT); AVL Fuel Cell Canada Inc., Burnaby (CA)

( * ) Notice: Subject to any disclaimer, the term of this patent is extended or adjusted under 35 U.S.C. 154(b) by 568 days.

(21) Appl. No.: 18/017,101

(22) PCT Filed: Jul. 22, 2021

(86) PCT No.: PCT/EP2021/070479
§ 371 (c)(1),
(2) Date: Jan. 20, 2023

(87) PCT Pub. No.: WO2022/018183
PCT Pub. Date: Jan. 27, 2022

(65) Prior Publication Data
US 2023/0290985 A1    Sep. 14, 2023

(30) Foreign Application Priority Data
Jul. 23, 2020 (EP) ..................................... 20187466

(51) Int. Cl.
*H01M 8/248* (2016.01)
*H01M 8/0438* (2016.01)
*H01M 8/1018* (2016.01)
*H01M 8/10* (2016.01)

(52) U.S. Cl.
CPC ......... *H01M 8/248* (2013.01); *H01M 8/0438* (2013.01); *H01M 8/1018* (2013.01); *H01M 2008/1095* (2013.01)

(58) Field of Classification Search
CPC .. H01M 8/248; H01M 8/0438; H01M 8/1018; H01M 2008/1095; H01M 8/2475; Y02E 60/50
See application file for complete search history.

(56) References Cited

U.S. PATENT DOCUMENTS 10,840,528 B2 * 11/2020 Hickey ............. H01M 8/04753
2004/0121216 A1 * 6/2004 Blanchet ............... H01M 8/248
                                                                 429/470
2005/0277012 A1 12/2005 Inagaki
(Continued)

OTHER PUBLICATIONS

International Search Report and the Written Opinion Dated Jan. 11, 2022 From the International Searching Authority Re. Application No. PCT/EP2021/070479. (9 Pages).

*Primary Examiner* — Muhammad S Siddiquee (57) ABSTRACT

This invention relates to designs and methods for desirably allowing the incorporation and/or removal of load cells (10) in a fuel cell stack (1) without significantly changing the load on the series stack of fuel cells when doing so. A relevant fuel cell stack (1) is of a simple construction comprising a compression assembly (18) located in an opening in an end-plate (3, 4) in which the assembly comprises a spring cap (11) with an inner shoulder (11*a*), a load cell button (12) slidable in the stack direction, and a spring assembly (13). A load cell (10) can then be incorporated along with an appropriate load cell cap (15), or removed in a like manner, without a significant change in load.

15 Claims, 3 Drawing Sheets

(56) References Cited

U.S. PATENT DOCUMENTS

| | | | |
|---|---|---|---|
| 2009/0162726 A1* | 6/2009 | Ozgur | H01M 8/241 429/434 |
| 2011/0003230 A1* | 1/2011 | Ozgur | H01M 8/2483 429/470 |
| 2018/0175418 A1* | 6/2018 | Hickey | H01M 8/04679 |

* cited by examiner

REMOVABLE LOAD CELL DESIGN FOR FUEL CELL STACK

RELATED APPLICATIONS

This application is a National Phase of PCT Patent Application No. PCT/EP2021/070479 having International filing date of Jul. 22, 2021, which claims the benefit of priority of Europe patent application No. 20187466.6 filed on Jul. 23, 2020. The contents of the above applications are all incorporated by reference as if fully set forth herein in their entirety.

FIELD AND BACKGROUND OF THE INVENTION

This invention relates to designs and methods for allowing the incorporation and/or removal of load cells into a fuel cell stack without significant change in load on the fuel cells in the stack. It is particularly suitable for solid polymer electrolyte fuel cell stacks.

Fuel cells such as solid polymer electrolyte membrane fuel cells electrochemically convert fuel and oxidant reactants, such as hydrogen and oxygen or air, to generate electric power. Solid polymer electrolyte fuel cells generally employ a proton conducting, solid polymer membrane electrolyte between cathode and anode electrodes. The electrodes typically comprise appropriate catalysts to promote the electrochemical reactions taking place at each electrode. A structure comprising a solid polymer membrane electrolyte sandwiched between these two electrodes is known as a membrane electrode assembly (MEA). In one common embodiment, the MEA comprises a catalyst coated membrane (CCM) and gas diffusion layers (GDLs) applied on each side of the CCM. In the CCM, appropriate catalyst compositions have been applied and bonded to either side of the membrane electrolyte. The GDLs are provided to improve both the distribution of the fluid reactants to the electrodes and the removal of fluid by-products from the electrodes.

In addition, in a typical fuel cell, flow field plates comprising numerous fluid distribution channels for the reactants are provided on either side of a MEA to distribute fuel and oxidant to the respective electrodes and to remove reaction by-products from the fuel cell. Water is the primary by-product in a cell operating on hydrogen and air reactants. Because the output voltage of a single cell is of order of 1V, a plurality of cells is usually stacked together in series for commercial applications in order to provide a higher output voltage for practical purposes. Fuel cell stacks can be further connected in arrays of interconnected stacks in series and/or parallel for use in automotive applications and the like.

SUMMARY OF THE INVENTION

For several reasons, the components in such fuel cell stacks generally need to be under some significant mechanical compression. These reasons include: eliminating gaps and reducing contact resistances between components, reliably achieving the numerous seals separating the various fluids throughout the stack, and even simply keeping all the components in place when the stack is operated, handled, or subjected to vibration, etc. Some compliance is required because certain components undergo compression set (i.e. a permanent deformation under prolonged loading). Furthermore, too much compression can result in damage and/or displacement of certain components that adversely affect performance and sealing. Thus, providing the right amount of compliant compression or load is important and accordingly it is desirable to be able to measure it properly. This is true not only during assembly of a stack but also potentially afterwards, e.g. after the stack has been in service for some time, for maintenance, diagnostics, refurbishment, and/or other purposes.

The hardware required to provide a desired compression or load within a fuel cell stack can be quite simple. In stacks comprising a plurality of planar fuel cells, compliant compression is typically provided using two rigid end-plates, a compression plate, and a compliant compression assembly therebetween. The two rigid end-plates appear at opposite ends of the stack and are connected together at a fixed distance apart in some fashion (e.g. via tie rods or straps). Inside the stack, the compression assembly is used to urge the compression plate against the adjacent end of the series stack of fuel cells and away from the adjacent end-plate, thereby compressing the compression plate. Typical compression assemblies involve simple spring assemblies, e.g. a suitable number of stacked disc springs, which can provide both the required load and the compliance.

Numerous options for fuel cell stack designs and compression assemblies have been suggested in the art. Many of these allow for adjustment of the compression or loading on the cells inside. As an example, US20180145366 relates to a fuel cell device with a pressing device and pretensioning unit with an adjusting element for providing adjustable compression to a stack. As a further example, WO2004/062017 discloses a compression system including compression plates and compression assemblies including a compression pack for maintaining compressive load on the stack as it creeps throughout its life and to compensate for thermal expansion of the stack under varying operating conditions. Each compression assembly is at least partially disposed exterior to the vessel. As another example, DE102017220595 discloses an arrangement employing external threaded caps that allows for simple assembly, with the fuel cell stack being pretensioned by tensioning elements and spring elements in order to compensate for a shortening of the fuel cell stack due to aging and to keep the fuel cell stack under sufficient pretension.

It is generally important that the amount of loading applied to the cells in the stack be carefully controlled. With too little loading, the goals of eliminating gaps, reducing contact resistances, achieving sealing and so on may not be achieved. On the other hand, with too much loading, damage can occur to the components therein including deformation, shorting, and so on. Setting the amount of loading during assembly of the stack and maintaining an acceptable loading over the lifetime of the stack is thus important. Commonly then, load cells have been employed to measure loading during assembly and frequently have been incorporated into assembled stacks in order to monitor loading over the operating life of the stack. However, load cells can be relatively expensive devices and also can add undesirable weight and volume to product stacks. Numerous options for fuel cell stack arrangements and methods of use have thus also been suggested in the art to allow for the use of load cells. These options include arrangements that allow for load cells to be used during assembly only or which permanently retain the load cells. Also, though, certain options may allow for the incorporation or removal of load cells post-assembly but which involve a partial disassembly and unloading of the stack. In such options, when compression on the stack is relaxed substantially, potentially permanent adverse consequences can result, including seals potentially leaking, components shifting out of place, and so on.

As examples of the preceding, stacks in US20190140302 include a surface pressure sensor and an adjustment unit which adjusts a surface pressure applied to the unit cells in the stacking direction. As other examples, U.S. Pat. No. 8,343,683, JP2003-173805, and JP5574746 employ load cells in their construction. Interestingly, the latter employs a load cell to serve as a moisture detecting unit. Further, JP2006-108058 discloses a method and an arrangement in which a load cell is employed in an assembly jig for assembly purposes but is not incorporated permanently into the fuel cell stack. Further still, options like those disclosed in U.S. Pat. No. 8,802,325 may include load cells in the stack construction that appear to be removable post-assembly, but doing so would require removing apparatus such as tensioning bars and thus would substantially remove the applied internal load while doing so. In yet another approach, U.S. Pat. No. 7,901,828 discloses an arrangement employing external adjustable screws for applying compression loading which is intended to allow the compressive load to be precisely grasped, without using any load cell, and thereby obviate the need for an expensive device such as a load cell at all.

Notwithstanding the preceding, if the accuracy provided by load cell measurements is desired or required at various times over the life of a fuel cell stack, it is desirable to be able to removably incorporate load cells in a simple manner without significantly changing the loading on the stack when doing so. The present invention fulfills these needs and provides further related advantages.

The present invention includes designs and methods which desirably allow for load cells to be incorporated and/or removed from a fuel cell stack at any time without significantly changing the compression load on the series stack of fuel cells when doing so. Thus, for instance, load cells can be incorporated or removed for purposes of accurately measuring and setting this load during assembly or alternatively for diagnostic, maintenance/tuning, refurbishment, or other purposes after assembly and subsequent operation.

The invention is appropriate for use in a typical fuel cell stack comprising a unit cell block comprising a plurality of essentially planar fuel cells stacked in series. Such a unit cell block has first and second ends with first and second end-plates provided which oppose the first and second ends of the unit cell block respectively. In such a fuel cell stack, these first and second end-plates are connected together at a fixed distance apart. This is achieved by having the first end-plate serve as a compression surface for the first end of the unit cell block and by providing a compression plate between the second end of the unit cell block and the second end-plate of the fuel cell stack where the compression plate serves as a compression surface for the second end of the unit cell block. Compressive load is provided by a compression assembly which urges the compression plate away from the second end-plate thereby applying a load to the second end of the unit cell block by the compression plate. In particular, the invention is appropriate for use in typical solid polymer electrolyte fuel cell stacks.

In the present invention, the second end-plate in the fuel cell stack comprises an opening for the compression assembly, and the compression assembly is located in this opening in the second end-plate. The compression assembly itself comprises a spring cap, a load cell button, and a spring assembly. The spring cap is attached to the opening in the second end-plate and the spring cap comprises an inner shoulder. The load cell button is for engagement with a load cell, in which the load cell button is located between the spring cap and the compression plate and is slidable therebetween in the stack direction. Further, the inner shoulder of the spring cap acts as a stop for the load cell button. The spring assembly is located between and engages with the compression plate and the load cell button at opposite ends of the spring assembly. With this construction, a first load is applied to the second end of the unit cell block by the spring cap, the load cell button, the spring assembly, and the compression plate.

In an exemplary practical embodiment of the invention, the opening in the second end-plate and the periphery of the spring cap are compatibly threaded, such that the spring cap threads engage with those of the opening and can thereby fix the spring cap to the opening. Further, the spring cap is then adjustable in the stack direction of the fuel cell stack by screwing the spring cap into or out of the second end-plate.

A suitable spring assembly for use in this invention comprises a stack of disc springs. However, other alternatives may be employed using different mechanical, pneumatically operated, or other approaches known to those skilled in the art.

Other embodiments of the invention may comprise a jack screw in the shoulder of the spring cap which can engage with and separate the load cell button from the shoulder of the spring cap. Further, the load cell button can comprise a central opening for locating engagement with a load cell. A locating O-ring or set of O-rings may additionally be employed to prevent wobbling of the slidable load cell button.

In certain fuel cell stacks, e.g. those with relatively large aspect ratios, it can be advantageous or even necessary to include more than one compression assembly to provide for uniform compression of the unit cell block. Such embodiments would thus comprise more than one opening in the second end-plate and more than one corresponding compression assembly.

The preceding describes the construction of a fuel cell stack of the invention which is capable of removably incorporating a load cell without significantly disturbing the compression load on the cell stack. However, it describes the construction of the fuel cell stack when it is in a state without a load cell or load cells incorporated into it yet. With a load cell incorporated in accordance with the invention, the fuel cell stack additionally comprises a load cell cap attached to the second end-plate or the spring cap, and a load cell engaged with the load cell button at one end and the load cell cap at the other end such that the load cell button stands separated from the inner shoulder of the spring cap. In this way, a second load can be applied to the second end of the unit cell block by the load cell cap, the load cell, the load cell button, the spring assembly, and the compression plate.

Using the present invention, the load in the fuel cell stack can remain close to or essentially unchanged regardless of whether a load cell is incorporated or not in the fuel cell stack. That is, during static situations, the load with no load cell incorporated (i.e. the first load) can remain close to or essentially equal to the load with an incorporated load cell (i.e. the second load). When essentially equal, the ratio of the second load to the first load is thus 1:1. However, in certain circumstances it may even be advantageous for the first and second loads to differ slightly, e.g. where the ratio of the second load to the first load is between 1.2:1 and 1:1.2. For instance, instead of increasing the load undesirably to assist in the incorporation or removal of a load cell, it can instead be preferable to reduce the load in the fuel cell stack slightly, but temporarily, prior to incorporating or removing the load cell, then removing or incorporating the load cell, and finally increase the load back to its original state. In these temporary situations, the reduced load can be slightly less than the first and/or second loads, e.g. where the ratio of the reduced load to either the first or second loads is perhaps temporarily up to about 1:1.2.

Using the aforementioned fuel cell stack construction, a load cell can then easily be incorporated to measure the load applied to the unit cell block with minimal change to the applied load. This can be accomplished simply by incorporating the load cell into the fuel cell stack so as to engage with the load cell button, and then attaching a load cell cap to the second end-plate or to the spring cap such that the load cell cap contacts the load cell and such that the load cell button stands separated from the inner shoulder of the spring cap. In this way, a second load is applied to the second end of the unit cell block by the load cell cap, the load cell, the load cell button, the spring assembly, and the compression plate.

In an exemplary embodiment in which the opening in the second end-plate and the periphery of the spring cap are compatibly threaded and in engagement such that the spring cap is adjustable in the stack direction of the fuel cell stack by screwing the spring cap into or out of the second end-plate, the method of incorporating a load cell can comprise the following steps: before the step of attaching the load cell cap, screwing the spring cap out of the second end-plate to reduce the load applied to the unit cell block to a reduced load wherein the ratio of the reduced load to the first load is in the range from 1:1 to 1:1.2, and attaching the load cell cap such that the load cell button stands separated from the inner shoulder of the spring cap and such that the second load applied to the second end of the unit cell block is about equal to the first load.

In an alternative embodiment in which the fuel cell stack comprises a jack screw in the inner shoulder of the spring cap engaged with and separating the load cell button from the shoulder of the spring cap, the method of incorporating a load cell can comprise the following steps: after attaching the load cell cap, screwing the jack screw out of the inner shoulder of the spring cap to transfer the load applied to the unit cell block through the jack screw to the incorporated load cell such that the second load applied to the second end of the unit cell block is about equal to the first load.

In general, an incorporated load cell can be removed from fuel cell stacks of the invention with minimal change to the load applied to the unit cell block simply by removing the load cell cap from the second end-plate or the spring cap, and removing the load cell from the fuel cell stack. In the aforementioned exemplary embodiment in which the opening in the second end-plate and the periphery of the spring cap are compatibly threaded and in engagement such that the spring cap is adjustable in the stack direction of the unit cell block by screwing the spring cap into or out of the second end-plate, the step of removing the load cell cap can result in the load cell button sliding to stop on the inner shoulder of the load cell cap and reducing the load applied to the unit cell block to a reduced load wherein the ratio of the reduced load to the second load is in the range from 1:1 to 1:1.2. The method of removing then can additionally comprise screwing the spring cap into the second end-plate to increase the load applied to the unit cell block to the first load wherein the first load is about equal to the second load. In the aforementioned alternative embodiment in which the fuel cell stack comprises a jack screw in the inner shoulder of the spring cap, the method of removing comprises screwing the jack screw into the inner shoulder of the spring cap to transfer the load applied to the unit cell block through the incorporated load cell to the jack screw wherein the first load is about equal to the second load.

These and other aspects of the invention are evident upon reference to the attached Figures and following detailed description.

DESCRIPTION OF SPECIFIC EMBODIMENTS OF THE INVENTION

In this specification, words such as "a" and "comprises" are to be construed in an open-ended sense and are to be considered as meaning at least one but not limited to just one.

In a quantitative context, herein the term "about" should be construed as being in the range up to plus 10% and down to minus 10%.

The phrase "consisting essentially of" should be construed as including only those specific items being referred to but also including other items that do not materially affect the basic characteristics or nature of the element or step they are part of.

The phrase "unit cell block" is used to refer to the plurality of essentially planar, individual fuel cells stacked in series within a fuel cell stack.

The phrase "stack direction" is used in reference to fuel cell stacks comprising a unit cell block of essentially planar fuel cells stacked in series. The "stack direction" is the direction along which the cells are stacked, i.e. normal to the plane of the fuel cells.

Figure 1:
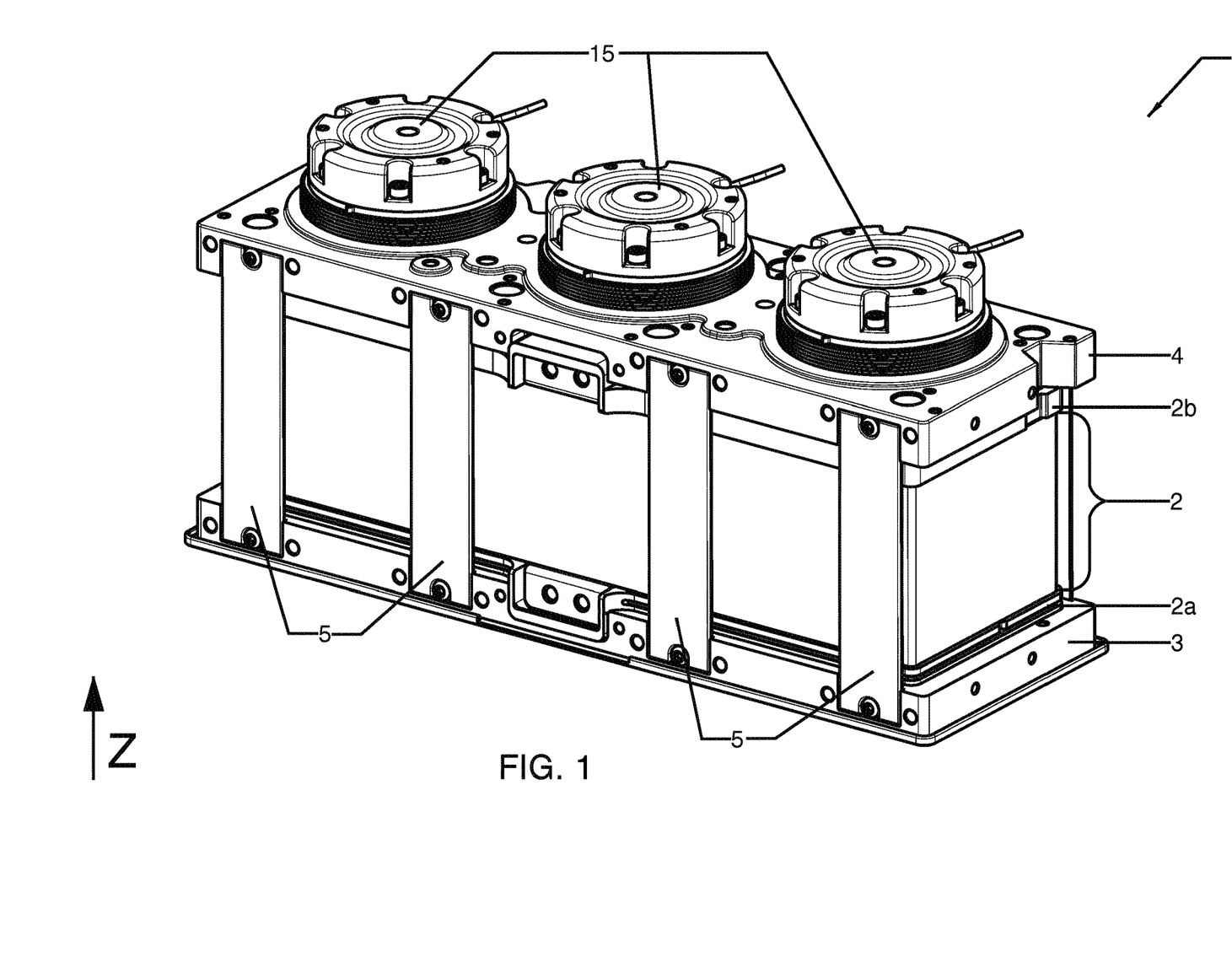
FIG. 1 shows an isometric view of an exemplary fuel cell stack of the invention with three load cells incorporated into the stack.

The present invention provides designs and methods that conveniently allow for the incorporation and/or removal of load cells in a fuel cell stack 1 without ever significantly changing the load on the unit cell block of fuel cells. It is particularly suitable for use with solid polymer electrolyte fuel cell stacks. Such stacks can be employed as power supplies in numerous applications, e.g. automotive and other traction applications. FIG. 1 shows an isometric view of an exemplary inventive solid polymer electrolyte fuel cell stack 1 in which three load cells (not visible in this figure) have been incorporated into the stack.

Fuel cell stack 1 contains unit cell block 2 which comprises a plurality of essentially planar solid polymer electrolyte cells stacked in series. The unit cell block 2 has two ends, namely first end 2a and second end 2b. First end-plate 3 and second end-plate 4 oppose first end 2a and second end 2b respectively. First and second end-plates 3 and 4 are connected together at a fixed distance apart and, as shown in FIG. 1, this connection is obtained using a number of straps 5 around the perimeter of stack 1. Straps 5 secure end-plates 3 and 4 together which in turn serve to support and keep the cells in unit cell block 2 and end-plates 3 and 4 aligned in the stack. Also as shown, straps 5 can be released (by loosening the screws securing straps 5 to end-plate 3) to allow for adjustment of the separation distance between end-plates 3 and 4 if desired. Also visible in FIG. 1 are three load cell caps 15 which are attached to second end-plate 4. Not visible in FIG. 1 however are the compression plate 16 and compression assembly 18 components involved.

Figure 2:
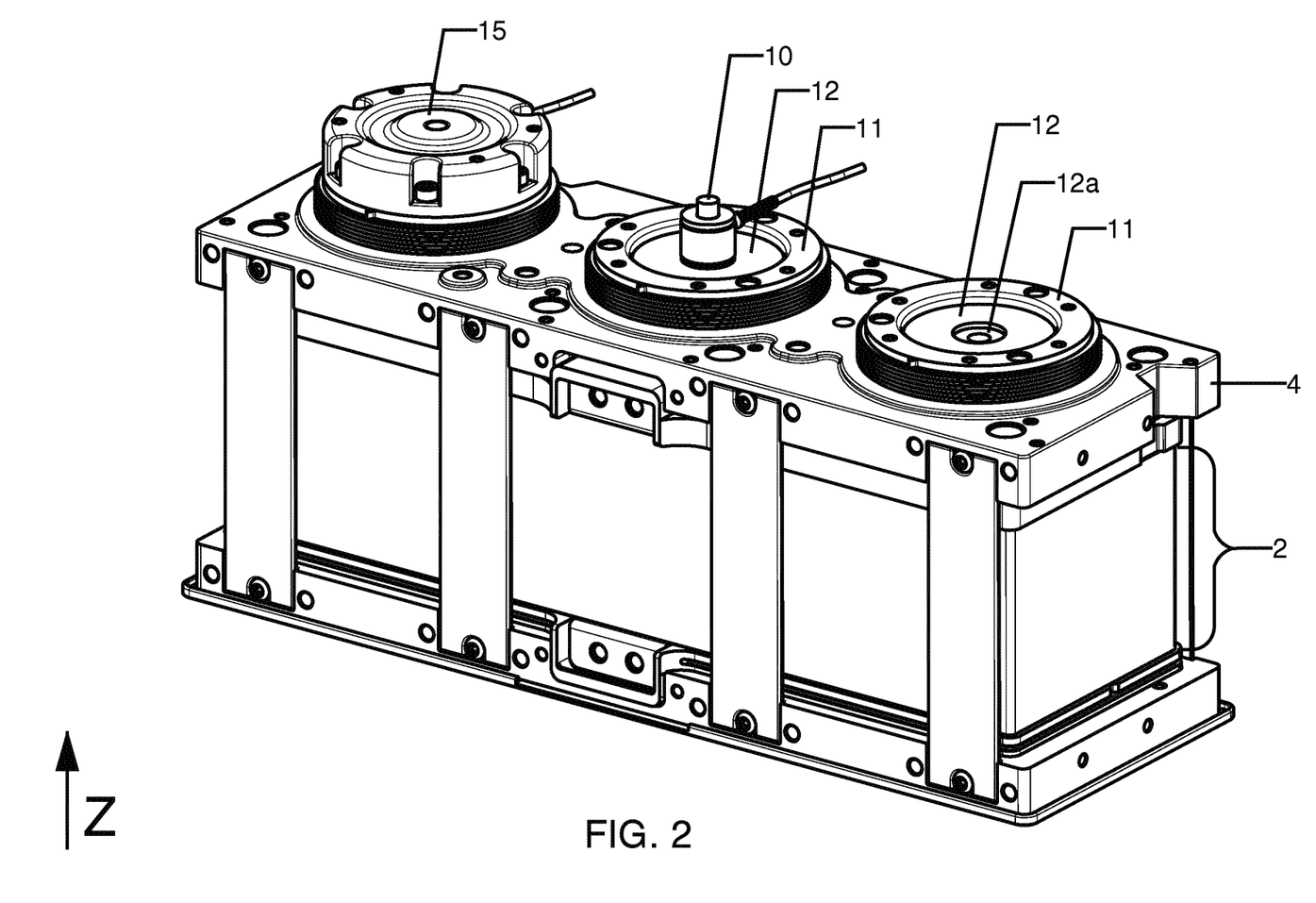
FIG. 2 shows a view of the inventive fuel cell stack of FIG. 1 in which the components housing the middle load cell have been removed and in which both the components housing the rightmost load cell and the associated load cell have been removed.

Next, FIG. 2 shows a view of the inventive fuel cell stack 1 of FIG. 1 but after the components housing middle load cell 10 have been removed and also after both the components housing the rightmost load cell and the associated rightmost load cell have been removed. Visible now in FIG. 2 are cylindrical spring caps 11 associated with the compression assemblies for the middle and rightmost load cells 10. Spring caps 11 are attached to openings in second end-plate 4. Here, this has been achieved by compatibly threading the periphery of spring caps 11 (not visible) with threads provided in the openings in second end-plate 4. Spring caps 11 can thus be screwed into or out of second end-plate 4 as desired and thus is adjustable in the stack direction (denoted by arrow z).

Also visible in FIG. 2 are the tops of load cell buttons 12 which are located between spring caps 11 and compression plate 16 (not visible in FIG. 2) and which can slide in the stack direction. Load cell buttons 12 are prevented from popping out of stack 1 by inner shoulders 11a (not visible) provided on spring caps 11.

Also visible in FIG. 2 is central opening 12a in rightmost load cell button 12 which serves to locate and engage with a load cell if one is be incorporated. Load cell 10 is shown located and engaged with the middle spring cap 11 in FIG. 2. Not visible in FIG. 2 are spring assemblies 13 which also form part of the compression assemblies used in the invention.

Figure 3:
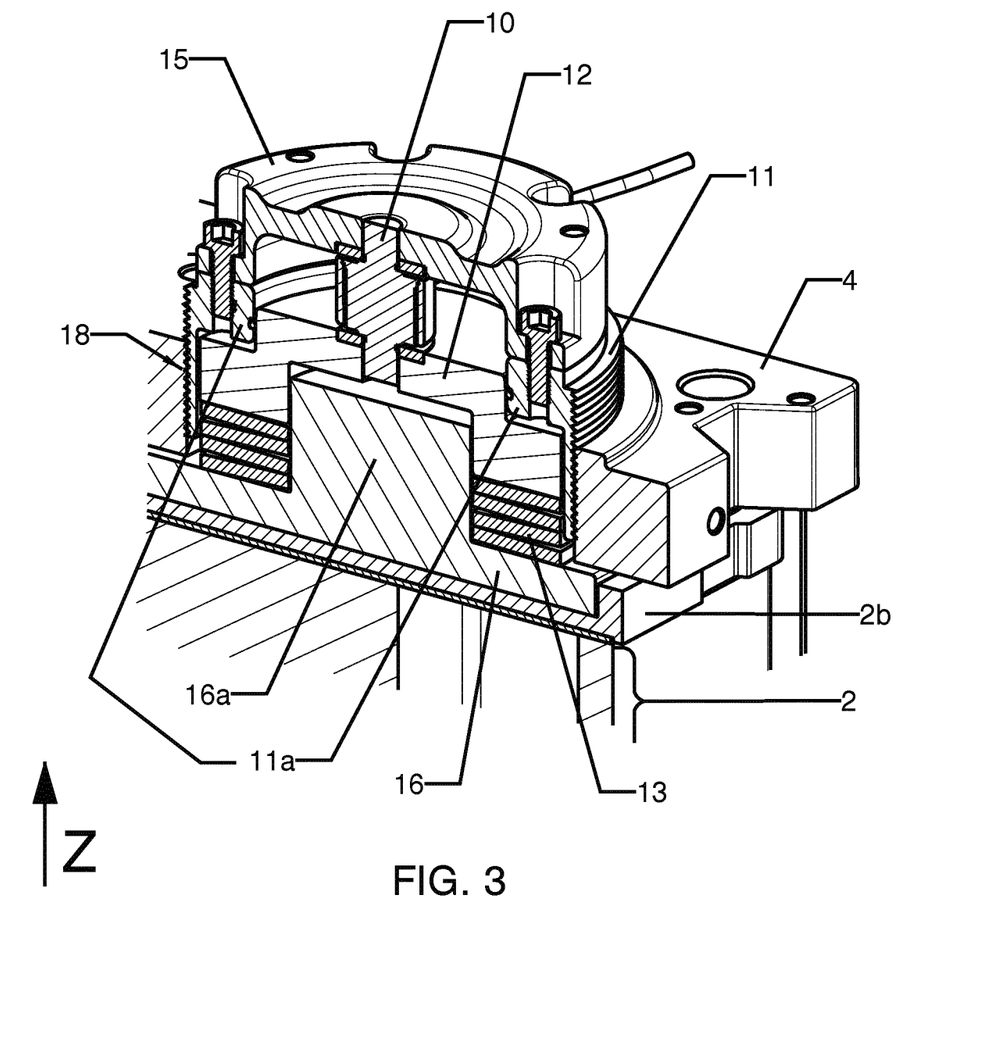
FIG. 3 shows a cross-sectional view of a compression assembly with an incorporated load cell in the inventive fuel cell stack of FIG. 1.

FIG. 3 shows a cross-sectional view of a complete compression assembly 18 in fuel cell stack 1 of FIG. 1, along with an incorporated load cell 10 and load cell cap 15. Here, compression plate 16 is visible and serves as a compression surface against second end 2b of unit cell block 2. Spring assembly 13, comprising a stack of disc springs, is also visible. Here, spring assembly 13 is located around a post 16a which is formed in and is a part of compression plate 16. Spring assembly engages with compression plate 16 and urges it against second end 2b of unit cell block 2 and towards first end-plate 3.

The simple arrangement and functioning of compression assembly 18 is readily evident in FIG. 3. In FIG. 3, the load applied to compression plate 16 arises from the compression of the disc springs of spring assembly 13. Spring assembly 13 is in direct contact with load cell button 12, which in turn is in direct contact with load cell 10, which in turn is in direct contact with load cell cap 15. Load cell cap 15 is attached to spring cap 11 which in turn is attached to second end-plate 4. In this configuration, load cell button 12 is slightly spaced away from inner shoulder 11a of spring cap 11. Here then, essentially all the load applied to compression plate 16 is transmitted though load cell 10 and thus load cell 10 can be used to provide a very accurate measure of the load applied.

On the other hand, with load cell 10 and load cell cap 15 removed, it is evident from FIG. 3 that load cell button 12 would be pressed by spring assembly 13 so as to instead contact inner shoulder 11a. In this case then, with the load cell removed, essentially all the load applied to compression plate 16 is instead transmitted to spring cap 11.

In a typical use of the invention then, during assembly of a fuel stack, the stack may be assembled in a conventional manner up to the point that compression is to be applied to unit cell block 2. Compression plate 16, with spring assembly 13 and load cell button 12 placed on post 16a, can be located appropriately at second end 2b of unit cell block 2. Second end-plate 4 is prepared for use by partially screwing in spring cap 11 and then this assembly is located appropriately above compression plate 16. Thereafter, the assembly is pressed together and straps 5 are attached to fix the two end-plates 3, 4 together at a set desired distance apart. Since spring cap 11 is only partially screwed into second end-plate 4, the load on the unit cell block can be sufficient to keep the components located and in alignment, but is not yet high enough to serve as the desired nominal operating load. At this point, this sub-nominal load is either all transferred from load cell button 12 directly to shoulder of spring cap 11 if load cell 10 is not installed, or all transferred from the load cell button 12 to the load cell cap 15 if load cell 10 is installed. Next, to set the desired nominal load and thus complete assembly, load cell 10 and load cell cap 15 are installed if they are not yet installed. These components are dimensioned such that when load cell cap 15 is fully engaged with spring cap 11 that load cell button 12 is slightly displaced (denoted as displacement "d") off inner shoulder 11a. Now, the load is all being transmitted through load cell 10 and not spring cap 11. Spring cap 11 can now be further screwed into second end-plate 4, while continuously and accurately monitoring the applied load, until the desired nominal assembly loading is obtained, thereby completing assembly of the fuel cell stack 1 in this regard.

To subsequently remove load cell 10 in preparation for commercial use, load cell cap 15 and load cell 10 merely need to be removed without disturbing the relative setting of spring cap 11 in second end-plate 4. However, in doing so, load cell button 12 will slide slightly (i.e. displacement d) in the z direction to a stop on inner shoulder 11a and resulting in a slightly reduced load being applied to unit cell block 2. If important and/or desirable to maintain the exact nominal load, this is easily achieved by screwing spring cap 11 the appropriate amount into second end-plate 4 to compensate for displacement d.

Later, if desired to temporarily measure the applied load accurately for purposes of maintenance, adjustment, diagnostics or the like, the preceding process is merely reversed (i.e. back off spring cap 11 the same amount, and incorporate load cell 10 and load cell cap 15). In this way, essentially the same load can be maintained either with or without a load cell incorporated. And it is only during the transitions between these states that a very modest reduction in load results. Further, as will readily be apparent to those skilled in the art, the incorporation and removal process may be simplified so as to simply tolerate the modest changes in load associated with varying the position of load cell button 12 over the displacement d.

The preceding embodiment and associated methods of incorporation and removal of load cells are illustrative of the invention. Those skilled in the art will appreciate that numerous variations within the scope of the present invention are possible. For instance, while disc springs are a common, preferred means for use as a spring assembly other options based on mechanical, pneumatic, or hydraulic principles may be considered. Further, variations in which load cell caps are attached to the second end-plate 4 as opposed to the spring caps with corresponding appropriate changes to the methods may be considered. Further still, embodiments in which jack screws are provided, for instance in the shoulders of the spring caps, may be considered to engage with and separate the load cell buttons from the shoulders of the spring caps. Such jack screws may then be adjusted instead of the spring caps.

The following example is illustrative of certain aspects of the invention but should not be construed as limiting in any way A "10-cell short stack" (i.e. a fuel cell stack 1 with a unit cell block comprised of 10 series-stacked solid polymer fuel cells) was made in accordance with the embodiment shown in FIGS. 1 to 3. The short stack was assembled and compressed to an intended target load using incorporated load cells. The load cells were subsequently removed—causing the compressive load on the unit cell block to drop below target by about 20%. In order to compensate for the lost load, the spring caps were rotated one full turn, as designed, so as to increase the compressive load back to the intended target load.

The invention claimed is:

1. A fuel cell stack-(comprising:
   a unit cell block comprising a plurality of essentially planar fuel cells stacked in series wherein the unit cell block has first and second ends;
   first and second end-plates opposing the first and second ends of the unit cell block respectively wherein:
      the first and second end-plates are connected together at a fixed distance apart; and
      the first end-plate serves as a compression surface for the first end of the unit cell block;
   a compression plate between the second end of the unit cell block and the second end-plate wherein the compression plate serves as a compression surface for the second end of the unit cell block; and
   a compression assembly urging the compression plate away from the second end-plate thereby applying a load to the second end of the unit cell block by the compression plate;
characterized in that:
   the second end-plate comprises an opening for the compression assembly;
   the compression assembly is located in the opening in the second end-plate and comprises:
      a spring cap attached to the opening in the second end-plate, wherein the spring cap comprises an inner shoulder;
      a load cell button for engagement with a load cell, wherein the load cell button is located between the spring cap and the compression plate and is slidable therebetween in the stack direction z, and wherein the inner shoulder of the spring cap acts as a stop for the load cell button; and
      a spring assembly located between and engaging with the compression plate and the load cell button at opposite ends of the spring assembly;
wherein a first load is applied to the second end of the unit cell block by the spring cap, the load cell button, the spring assembly, and the compression plate.

2. The fuel cell stack according to claim 1, wherein the opening in the second end-plate and the periphery of the spring cap are compatibly threaded, wherein the spring cap threads engage with those of the opening thereby fixing the spring cap to the opening, and wherein in particular the spring cap is adjustable in the stack direction of the fuel cell stack by screwing the spring cap into or out of the second end-plate.

3. The fuel cell stack-according to claim 1, wherein the spring assembly comprises a stack of disc springs.

4. The fuel cell stack according to claim 1, comprising a jack screw in the inner shoulder of the spring cap engaged with and separating the load cell button from the inner shoulder of the spring cap.

5. The fuel cell stack according to claim 1, wherein the load cell button comprises a central opening for locating engagement with a load cell.

6. The fuel cell stack according to claim 1, comprising more than one opening in the second end-plate and more than one corresponding compression assembly.

7. The fuel cell stack-according to claim 1, additionally comprising:
   a load cell cap attached to the second end-plate or the spring cap; and
   a load cell engaged with the load cell button at one end and the load cell cap at the other end such that the load cell button stands separated from the inner shoulder of the spring cap;
wherein a second load is applied to the second end of the unit cell block by the load cell cap, the load cell, the load cell button, the spring assembly, and the compression plate.

8. The fuel cell stack according to claim 7, wherein the ratio of the second load to the first load is in the range from 1.2:1 to 1:1.2.

9. The fuel cell stack according to claim 1, wherein the fuel cells are solid polymer electrolyte fuel cells.

10. A method of incorporating a load cell into a fuel cell stack to measure the load applied to the unit cell block with minimal change to the applied load comprising;
   obtaining the fuel cell stack according to claim 1;
   incorporating a load cell into the fuel cell stack so as to engage with the load cell button; and
   attaching a load cell cap to the second end-plate or to the spring cap such that the load cell cap contacts the load cell and such that the load cell button stands separated from the inner shoulder of the spring cap;
wherein a second load is applied to the second end of the unit cell block by the load cell cap, the load cell, the load cell button, the spring assembly, and the compression plate.

11. The method according to claim 10, wherein the opening in the second end-plate and the periphery of the spring cap are compatibly threaded and in engagement such that the spring cap is adjustable in the stack direction of the fuel cell stack by screwing the spring cap into or out of the second end-plate, the method comprising:
   before the step of attaching the load cell cap, screwing the spring cap out of the second end-plate to reduce the load applied to the unit cell block to a reduced load wherein the ratio of the reduced load to the first load is in the range from 1:1 to 1:1.2; and
   attaching the load cell cap such that the load cell button stands separated from the inner shoulder of the spring cap and such that the second load applied to the second end of the unit cell block is about equal to the first load.

12. The method of according to claim 10, wherein the fuel cell stack comprises a jack screw in the inner shoulder of the spring cap engaged with and separating the load cell button from the shoulder of the spring cap, the method comprising:
   after attaching the load cell cap, screwing the jack screw out of the inner shoulder of the spring cap to transfer the load applied to the unit cell block through the jack screw to the incorporated load cell such that the second load applied to the second end of the unit cell block is about equal to the first load.

13. A method of removing a load cell from a fuel cell stack with minimal change to the load applied to the unit cell block comprising:

obtaining the fuel cell stack according to claim 7;

removing the load cell cap from the second end-plate or the spring cap; and removing the load cell from the fuel cell stack.

14. The method according to claim 13, wherein the opening in the second end-plate and the periphery of the spring cap are compatibly threaded and in engagement such that the spring cap is adjustable in the stack direction of the fuel cell stack by screwing the spring cap into or out of the second end-plate, and wherein the step of removing the load cell cap results in the load cell button sliding to stop on the inner shoulder of the load cell cap and reducing the load applied to the unit cell block to a reduced load wherein the ratio of the reduced load to the second load is in the range from 1:1 to 1:1.2; the method comprising:

- screwing the spring cap into the second end-plate to increase the load applied to the unit cell block to the first load wherein the first load is about equal to the second load.

15. The method according to claim 13, wherein the fuel cell stack comprises a jack screw in the shoulder of the spring cap, the method comprising:

- screwing the jack screw into the inner shoulder of the spring cap to transfer the load applied to the unit cell block through the incorporated load cell to the jack screw wherein the first load is about equal to the second load.

* * * * *